United States Patent
Gianzero et al.

(10) Patent No.: US 6,819,112 B2
(45) Date of Patent: Nov. 16, 2004

(54) METHOD OF COMBINING VERTICAL AND MAGNETIC DIPOLE INDUCTION LOGS FOR REDUCED SHOULDER AND BOREHOLE EFFECTS

(75) Inventors: Stanley C. Gianzero, Austin, TX (US); Li Gao, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 291 days.

(21) Appl. No.: 10/068,346

(22) Filed: Feb. 5, 2002

(65) Prior Publication Data

US 2003/0146752 A1 Aug. 7, 2003

(51) Int. Cl.$^7$ ............................. G01V 3/28; G01V 3/38
(52) U.S. Cl. ............................................ 324/343; 702/7
(58) Field of Search ............................. 324/338–343; 702/7

(56) References Cited

U.S. PATENT DOCUMENTS

| | | | |
|---|---|---|---|
| 3,060,373 A | 10/1962 | Doll | 324/1 |
| 3,808,520 A | 4/1974 | Runge | 324/6 |
| 4,251,773 A | 2/1981 | Cailliau et al. | 324/347 |
| 4,302,723 A | 11/1981 | Moran | 324/338 |
| 4,360,777 A | 11/1982 | Segesman | 324/339 |
| 4,698,911 A | 10/1987 | Rambow | 33/302 |
| 4,857,852 A | 8/1989 | Kleinberg et al. | 324/339 |
| 5,115,198 A | 5/1992 | Gianzero et al. | 324/339 |
| 5,757,191 A | 5/1998 | Gianzero | 324/339 |
| 5,999,883 A | * 12/1999 | Gupta et al. | 702/7 |
| 6,044,325 A | 3/2000 | Chakravarthy et al. | 702/7 |
| 6,466,872 B1 | * 10/2002 | Kriegshauser et al. | 702/7 |

OTHER PUBLICATIONS

L. Gao et al., *Virtual Steering Of Induction Tool For Determination Of Formation Dip Angle*, U.S. application ser. No. 09/925,997, filed Aug. 9, 2001 (25 pp.).

H. G. Doll, *The S.P. Log: Theoretical Analysis and Principles of Interpretation*, Transactions of the American Institute of Mining and Metallurgical Engineers, vol. 179, Petroleum Development and Technology 1949 Petroleum Branch (pp. 146–185).

S. Gianzero et al., *A New Look at Skin Effect\**, The Log Analyst, vol. 23, No. 1., Jan.–Feb. 1982 (pp. 20–34).

J. H. Moran et al., *Effects of Formation Anisotropy on Resistivity–Logging Measurements*, Geophysics, vol. 44, No. 7, Jul. 1979 (pp. 1266–1286).

\* cited by examiner

*Primary Examiner*—N. Le
*Assistant Examiner*—Reena Aurora
(74) *Attorney, Agent, or Firm*—Conley Rose, P.C.

(57) ABSTRACT

There is disclosed herein a method of enhancing the vertical resolution of an induction tool, in a manner that may advantageously also reduce undesirable borehole and "negative resistivity" effects. In one embodiment, the method comprises: a) obtaining a vertical magnetic dipole (VMD) response signal from a transmitter-receiver array of antenna elements having magnetic dipoles oriented parallel to a tool axis; b) obtaining a horizontal magnetic dipole (HMD) response signal from a transmitter-receiver array of elements having magnetic dipoles oriented perpendicular to the tool axis; and c) combining the VMD and HMD response signals to obtain a combination response signal. When the relative weights of the VMD and HMD response signals are set as described herein, the combination response signal (and any log calculated therefrom) has a narrow, substantially rectilinear, vertical measurement profile. Further, the combination response signal is relatively insensitive to borehole effects.

18 Claims, 6 Drawing Sheets

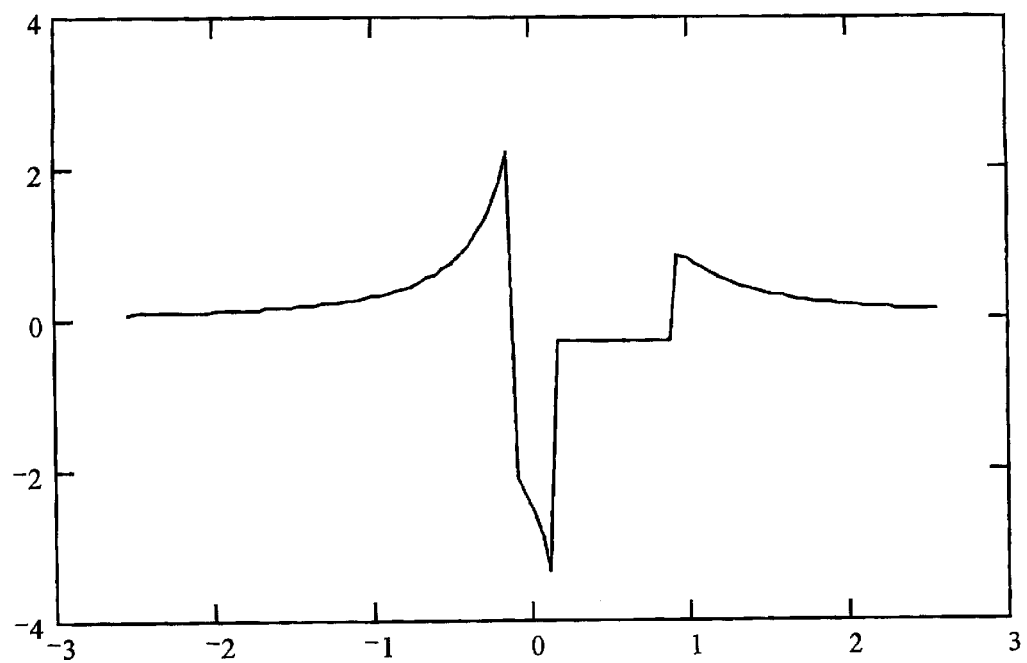
FIG. 3
FIG. 4
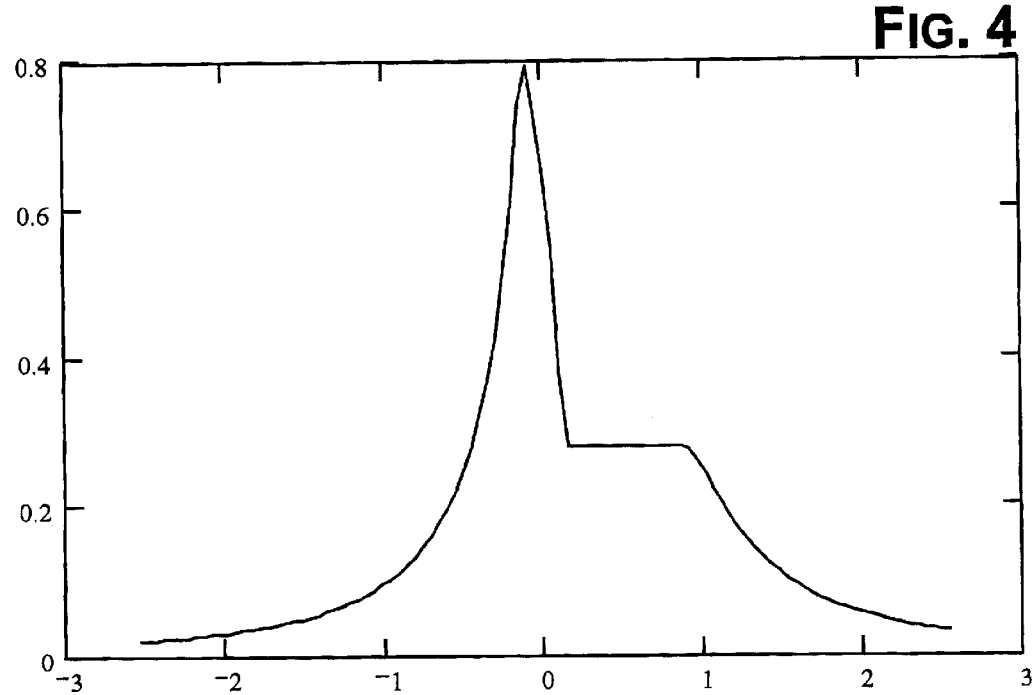

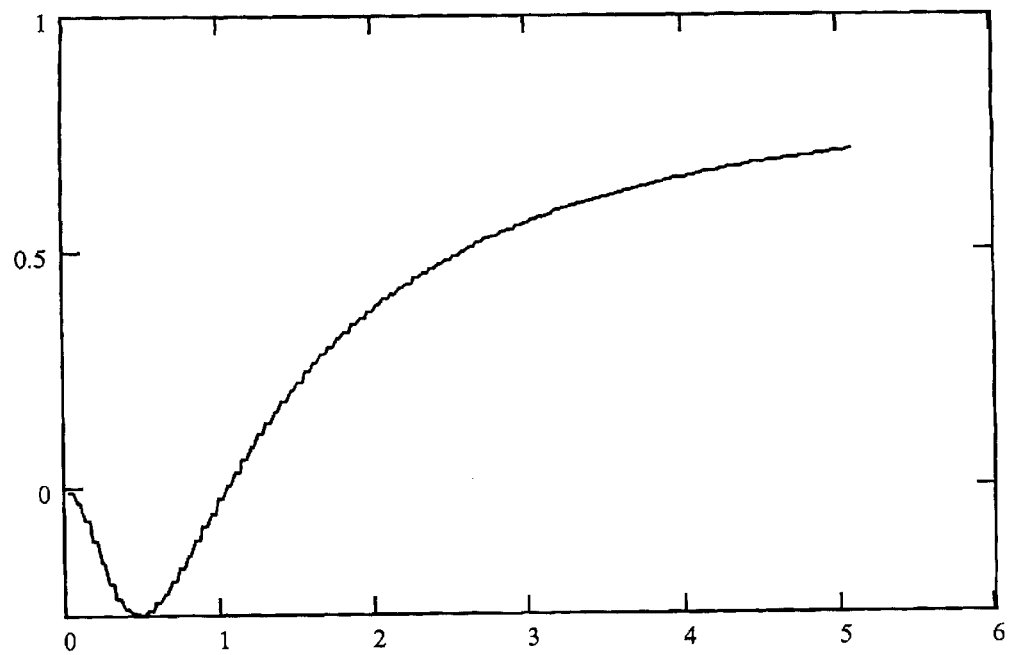
FIG. 6
FIG. 7
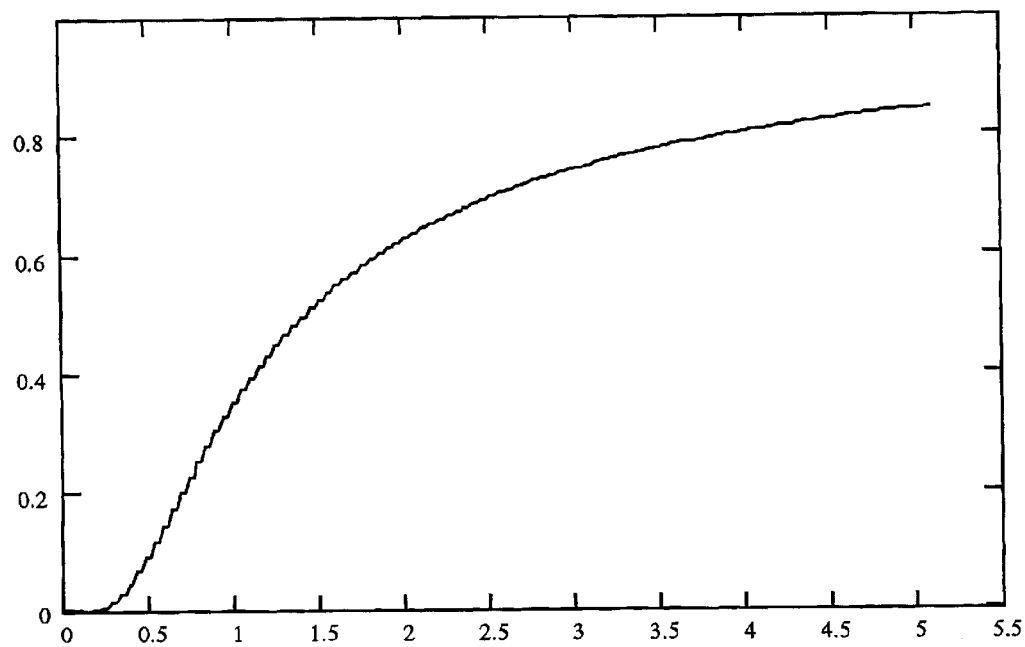

METHOD OF COMBINING VERTICAL AND MAGNETIC DIPOLE INDUCTION LOGS FOR REDUCED SHOULDER AND BOREHOLE EFFECTS

BACKGROUND

1. Field of the Invention

The present invention generally relates to methods and systems for measuring the properties of a formation through which a borehole passes. More particularly, the present invention relates to induction logging tools that measure the formation response to vertically- and horizontally-oriented dipoles. Still more particularly, the present invention relates to a method for combining the measured responses to achieve an induction log having reduced shoulder and borehole effects.

2. Description of the Related Art

The basic principles and techniques for electromagnetic logging for earth formations are well known. Induction logging to determine the resistivity (or its inverse, conductivity) of earth formations adjacent a borehole has long been a standard and important technique in the search for and recovery of subterranean petroleum deposits. In brief, the measurements are made by inducing electrical eddy currents to flow in the formations in response to an AC transmitter signal, and measuring the appropriate characteristics of a receiver signal generated by the formation eddy currents. The formation properties identified by these signals are then recorded at the surface as a function of the depth of the tool in the borehole. This record of the measurements is commonly termed "a log", or more specifically, "an induction log" of the formation.

It is well known that subterranean formations surrounding an earth borehole may be anisotropic with regard to the conduction of electrical currents. The phenomenon of electrical anisotropy is generally a consequence of either microscopic or macroscopic geometry, or a combination thereof, as follows.

In many sedimentary strata, electrical current flows more easily in a direction parallel to the bedding planes than it does in a direction perpendicular to the bedding planes. One reason is that a great number of mineral crystals possess a flat or elongated shape (e.g., mica or kaolin). At the time they were laid down, they naturally took on an orientation parallel to the plane of sedimentation. The interstices in the formations are, therefore, generally parallel to the bedding plane, and the current is able to easily travel along these interstices which often contain electrically conductive mineralized water. Such electrical anisotropy, sometimes called microscopic anisotropy, is observed mostly in shales.

Subterranean formations are often made up of a series of relatively thin beds having different lithological characteristics and, therefore, different resistivities. In well logging systems, the distances between the electrodes or antennas are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

If a sample is cut from a subterranean formation, the resistivity of the sample measured with current flowing parallel to the bedding planes is called the transverse or horizontal resistivity $\rho_H$. The inverse of $\rho_H$ is the horizontal conductivity $\sigma_H$. The resistivity of the sample measured with a current flowing perpendicular to the bedding plane is called the longitudinal or vertical resistivity, $\rho_v$, and its inverse the vertical conductivity $\sigma_V$. The anisotropy coefficient $\lambda$ is defined as: $\lambda = \sqrt{\sigma_h/\sigma_v}$.

In situations where the borehole intersects the formation substantially perpendicular to the bedding planes, conventional induction and electromagnetic wave propagation well logging tools are sensitive exclusively to the horizontal component of the formation resistivity. This is a consequence of the induced currents flowing in horizontal planes in the absence of formation dip or well deviation. Indeed, regarding Galvanic devices, the lack of sensitivity to anisotropy is even more stringent due to the "paradox of anisotropy", which states that any array of electrodes or sensors deployed along the axis of a wellbore in a vertical well is insensitive to the vertical component of resistivity, despite the intuitive expectation to the contrary.

However, it becomes possible to measure the vertical resistivity by orienting antenna coils away from the axis of the induction tool. An example of a commercial instrument that measures both horizontal and vertical resistivity is described by B. Kriegshauser, et al., describe this instrument in "A new multicomponent induction logging tool to resolve anisotropic formations", 41$^{st}$ Annual Logging Symposium, Society of Professional Well Log Analysts, paper D, pps. Jan 14, 2000. This instrument employs multiple multi-component coils (i.e. transmitter and receiver coils having axial and transverse orientations). Other tools designed to measure both horizontal and vertical resistivity are described in U.S. Pat. No. 4,302,723 entitled "Apparatus and method for determining dip and/or anisotropy of formations surrounding a borehole" by J. Moran and in U.S. patent application Ser. No. 09/583,184, entitled "Method for Iterative Determination of Conductivity in Anisotropic Dipping Formations" and filed May 30, 2000, by inventors L. Gao and S. C. Gianzero.

Unfortunately, induction logging of both horizontal and vertical resistivities suffers from what is termed the "shoulder effect". The true formation resistance is believed to vary as a function of depth in a fairly rectilinear fashion, i.e. the resistance changes discontinuously as one crosses boundaries between formation layers. However, because the tool measures the properties of a nonzero formation volume, the tool measurement actually varies gradually as the tool moves across a boundary. This is because some portion of formations on both sides of the boundary are within the measurement volume and consequently both contribute to the measurement until the tool is well past the boundary. In induction tools the measurement volume extends infinitely in all directions, with the effect of the formation resistance falling off exponentially with distance from the tool. The contribution of the formation outside the area of immediate interest produces a generally undesirable "softening" of the induction log, i.e. the resistance changes gradually as boundaries are encountered. This effect is most evident when thin formation layers are considered. Where an ideal resistivity tool would show two discontinuities from the opposite boundaries of the thin layer, the actual log shows only a small bump between the boundaries. In effect, the "shoulders" of the ideal resistivity tool have been erased.

Also, an induction log of vertical resistivities tends to suffer from an inordinate borehole effect. That is, the borehole fluid and borehole geometry affect the measurement of the formation resistivity in an undesirable way. A method of induction logging that reduces both the shoulder effect and the borehole effect would be very desirable.

SUMMARY OF THE INVENTION

Accordingly, there is disclosed herein a method of enhancing the vertical resolution of an induction tool, in a manner that may advantageously also reduce undesirable borehole and "negative resistivity" effects. In one embodiment, the method comprises: a) obtaining a vertical magnetic dipole (VMD) response signal from a transmitter-receiver array of antenna elements having magnetic dipoles oriented parallel to a tool axis; b) obtaining a horizontal magnetic dipole (HMD) response signal from a transmitter-receiver array of elements having magnetic dipoles oriented perpendicular to the tool axis; and c) combining the VMD and HMD response signals to obtain a combination response signal. When the relative weights of the VMD and HMD response signals are set as described herein, the combination response signal (and any log calculated therefrom) has a narrow, substantially rectilinear, vertical measurement profile. Further, the combination response signal is relatively insensitive to the negative borehole contribution intrinsic to HMD.

BRIEF DESCRIPTION OF THE DRAWINGS

A better understanding of the present invention can be obtained when the following detailed description of the preferred embodiment is considered in conjunction with the following drawings, in which:

FIG. 3 is a graph of a vertical measurement profile for a one transmitter, two receiver, HMD array;

FIG. 4 is a graph of a vertical measurement profile for a one transmitter, two receiver, VMD array;

FIG. 6 is a graph of an integrated radial measurement profile for a one transmitter, two receiver HMD array;

FIG. 7 is a graph of an integrated radial measurement profile for a one transmitter, two receiver VMD array;

Figure 1:
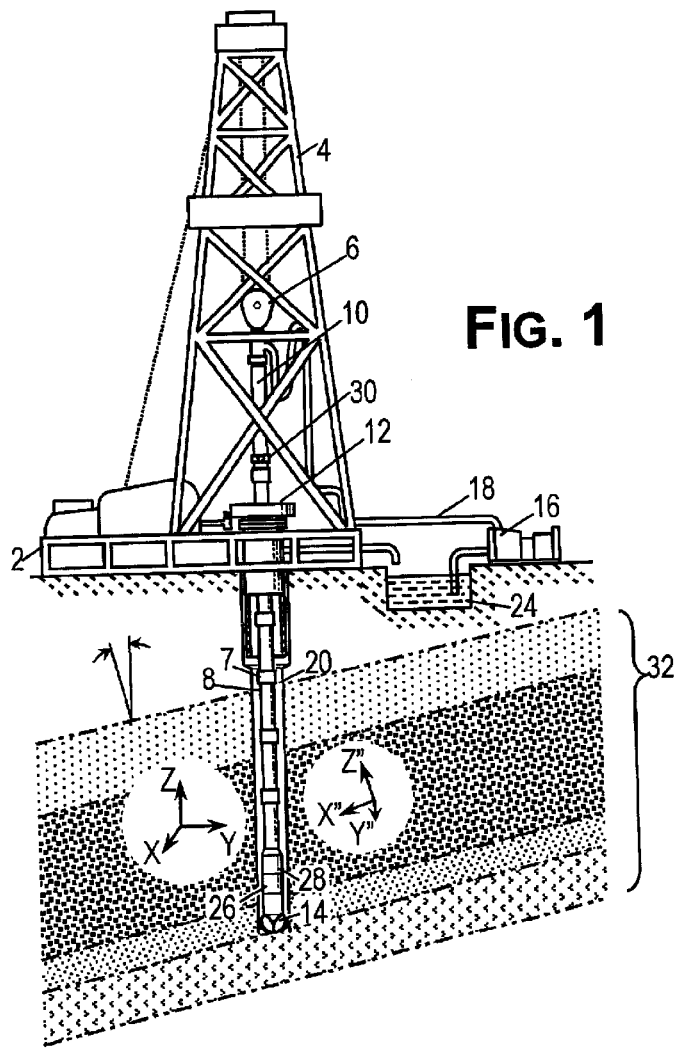
FIG. 1 shows a typical logging-while-drilling (LWD) environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Tool Configuration

Turning now to the figures, FIG. 1 shows a well during drilling operations. A drilling platform 2 is equipped with a derrick 4 that supports a hoist 6. Drilling of oil and gas wells is carried out with a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated (and drilling accomplished) by rotating the drill string 8, by use of a downhole motor near the drill bit, or by both methods.

Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

For LWD, downhole sensors 26 are located in the drill string 8 near the drill bit 14. The sensors 26 preferably include an induction tool having multi-axial transmitters and receivers. In a preferred embodiment, downhole sensors 26 are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques are known and may be used. The receiver 30 communicates the telemetry to a surface installation (not specifically shown) that processes and stores the measurements. The surface installation typically includes a computer system of some kind, e.g. a desktop computer.

The drill bit 14 is shown penetrating a formation having a series of layered beds 32 dipping at an angle. A first (x,y,z) coordinate system associated with the sensors 26 is shown, and a second coordinate system (x",y",z") associated with the beds 32 is shown. The bed coordinate system has the z" axis perpendicular to the bedding plane, has the y" axis in a horizontal plane, and has the x" axis pointing "downhill" along the bedding plane. The two coordinate systems are related by two rotations, known as the strike angle and the dip angle. Any vector in one of the coordinate systems can be expressed in the other coordinate system using basic rotational transform matrices. Consequently, given measurements in the coordinate system of the induction tool, the corresponding measurements in the coordinate system of the beds can be determined if the dip and strike angles are known. Methods for doing this are discussed in U.S. patent application Ser. No. 09/925,997, "Virtual Steering of Induction Tool for Determination of Dip Angle" and filed Aug. 9, 2001, by L. Gao and S. C. Gianzero.

In the preferred embodiment, the induction tool employs multi-axial transmitter and receiver "triads". Transmitter-receiver coupling measurements may be made along each axis and between axes as well. Because the principle of linear superposition applies to electromagnetic fields, rotational transforms can be used to manipulate the coupling measurements. The measurements of "virtual" transmitters and receivers having arbitrary orientations can be synthesized in this manner. So, despite the actual orientation of the tool transmitters and receivers with respect to the formation bedding plane, it is possible to determine the measurements that would be made by transmitters and receivers that line up with the coordinate system of the formation layers. To simplify the following discussion, it is assumed that indeed, such measurements are being made by the tool.

Figure 2:
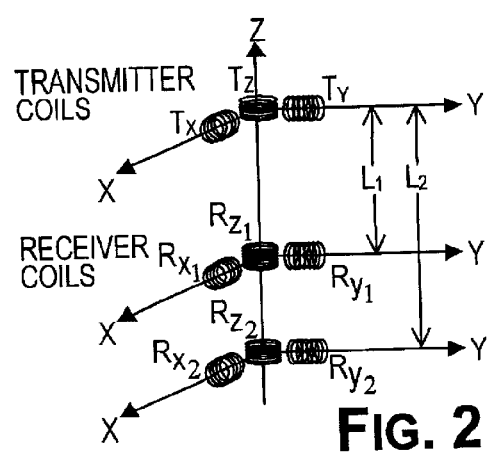
FIG. 2 shows a coil configuration of a conceptual triaxial induction tool.

FIG. 2 shows a conceptual sketch of a coil arrangement for a downhole induction tool. A triad of transmitter coils $T_x$, $T_y$ and $T_z$, each oriented along a respective axis, is provided. Two triads of similarly oriented receiver coils ($R_x{}^1$, $R_y{}^1$, $R_z{}^1$) and ($R_x{}^2$, $R_y{}^2$, $R_z{}^2$) are also provided, separated from the transmitter triad by L1 and L2, respectively. Each of the coils in the triads is parallel to the corresponding coils of the other triads, and the triads are spaced apart in the z-axis direction.

One way to study this arrangement of coils is to consider the horizontal and vertical coils separately. Transmitter coil $T_y$ has an axis that is perpendicular to the axis of the tool. When driven with an AC signal, this coil is equivalent to a magnetic dipole oriented along the axis of the coil, so this coil is termed a "horizontal magnetic dipole" transmitter. Receiver coils $R_y{}^i$ respond to magnetic fields in the same manner as magnetic dipoles oriented along the axes of the coils, and are accordingly termed "horizontal magnetic dipole" receivers. Transmitter coil $T_z$, and receiver coils $R_z{}^i$ are termed vertical magnetic dipole transmitter/receivers because their axes are parallel to the axis of the tool.

Geometric Factors and Vertical Measurement Profile

When an AC signal is provided to a transmitter coil $T_y$, the receiver coils $R_y{}^i$ provide an output AC signal in response. For any given signal frequency, the output signal is proportional to the transmitter signal (once a time delay is taken into account). The proportionality constant depends on the magnetic coupling between the transmitter coil and receiver coils, which in turn is affected by the properties of the formation enclosed by the measurement volume. As mentioned previously, the effect that any given portion of the formation has on the measurement is dependent on its position relative to the coils. The proportionality constant can be calculated in the following manner:

$$P = a \int_{-\infty}^{\infty} \int_0^{\infty} \int_{-\pi}^{\pi} \sigma g \, d\varphi dr dz$$

where a is a constant, σ is the conductivity of the formation (and may vary within the formation), and g is a geometric weighting factor that accounts for the relative contribution of each portion of the measurement volume to the overall measurement. The preferred coordinate system here is cylindrical, with φ being the azimuthal angle about the tool axis, r being the radial distance from the tool axis, and z being distance along the tool axis. The geometric factor for a horizontal magnetic dipole transmitter-receiver pair is:

$$g_{hmd} = \frac{|z_T - z_R|}{2} \frac{r[r^2 + 2(z - z_T)(z - z_R)]}{\sqrt{r^2 + (z - z_T)^2}^3 \sqrt{r^2 + (z - z_T)^2}^3}$$

where the transmitter is located on the tool axis at $z_T$ and the receiver is located on the tool axis at $z_R$.

Typically, the sensitivity of the tool to the formation signal is enhanced by combining the measurement of two receivers at different positions along the tool axis. This may be done by subtracting the response of $R_y{}^2$ from the response of $R_y{}^1$ in a manner that cancels any mutual inductance signal from the transmitter. Many induction tools also include an additional transmitter positioned symmetrically with respect to the receivers for temperature compensation. The geometric factor of one or more receivers to one or more transmitters can be determined by simply summing the geometric factors (with the appropriate sign) for each pairwise combination of transmitters and receivers:

$$G_{hmd} = \sum_T \sum_R g_{hmd}$$

For the following discussion, let $G_{hmd}$ be the total geometric factor for the difference signal of two horizontal magnetic dipole receivers in response to a horizontal magnetic dipole transmitter.

The vertical resolution of a tool having a given geometric factor can be determined from the vertical measurement profile of the tool. The vertical measurement profile can be calculated by integrating the geometric factor over the azimuthal angle φ and radius r:

$$V_{hmd}(z) = \int_0^{\infty} \int_{-\pi}^{\pi} G_{hmd} d\varphi dr$$

FIG. 3 shows this vertical measurement profile.

A similar calculation can be done to determine the vertical measurement profile of receiver coils $R_z{}^i$ to transmitter $T_z{}^i$. The geometric factor of a single vertical magnetic dipole transmitter-receiver pair is:

$$g_{vmd} = \frac{|z_T - z_R|}{2} \frac{r^3}{\sqrt{r^2 + (z - z_T)^2}^3 \sqrt{r^2 + (z - z_R)^2}^3}.$$

and when the receiver responses are combined, the total geometric factor is:

$$G_{vmd} = \sum_T \sum_R g_{vmd}$$

For the moment, assume that $G_{vmd}$ represents the total geometric factor for the difference signal of two vertical magnetic dipole receivers in response to a vertical magnetic dipole transmitter. The vertical measurement profile of the array is:

$$V_{vmd}(z) = \int_0^{\infty} \int_{-\pi}^{\pi} G_{vmd} d\varphi dr$$

This vertical measurement profile is graphed in FIG. 4.

Enhancing Vertical Resolution

The vertical measurement profiles shown in FIGS. 3 and 4 both suffer from long "tails" that gradually fall off in both directions along the z-axis. These tails allow portions of the formation outside the immediate area of interest to interfere with the measurement of properties inside the immediate area of interest. Further, the negative portions of the horizontal measurement profile make interpretation of those logs a matter of some difficulty. Importantly, however, these logs can be combined to produce a vertical measurement profile without tails. When the logs are combined in the following manner, the effective vertical measurement profile of the tool is that shown in FIG. 5.

Final Response=a×VMD response−b×HMD response where VMD response is the voltage signal of vertical magnetic dipole receiver array divided by the voltage signal provided to the vertical magnetic dipole transmitter array. Similarly, HMD response is the voltage signal from the horizontal magnetic dipole receiver array divided by the voltage signal provided to the horizontal magnetic dipole transmitter array. The parameters a and b are optimization parameters whose values are chosen so as to best enhance the vertical characteristics of the final response. For example, in FIG. 5, a=3/2, b=1/2. Other values of a and b may be used to optimize different aspects of the combination process.

Figure 5:
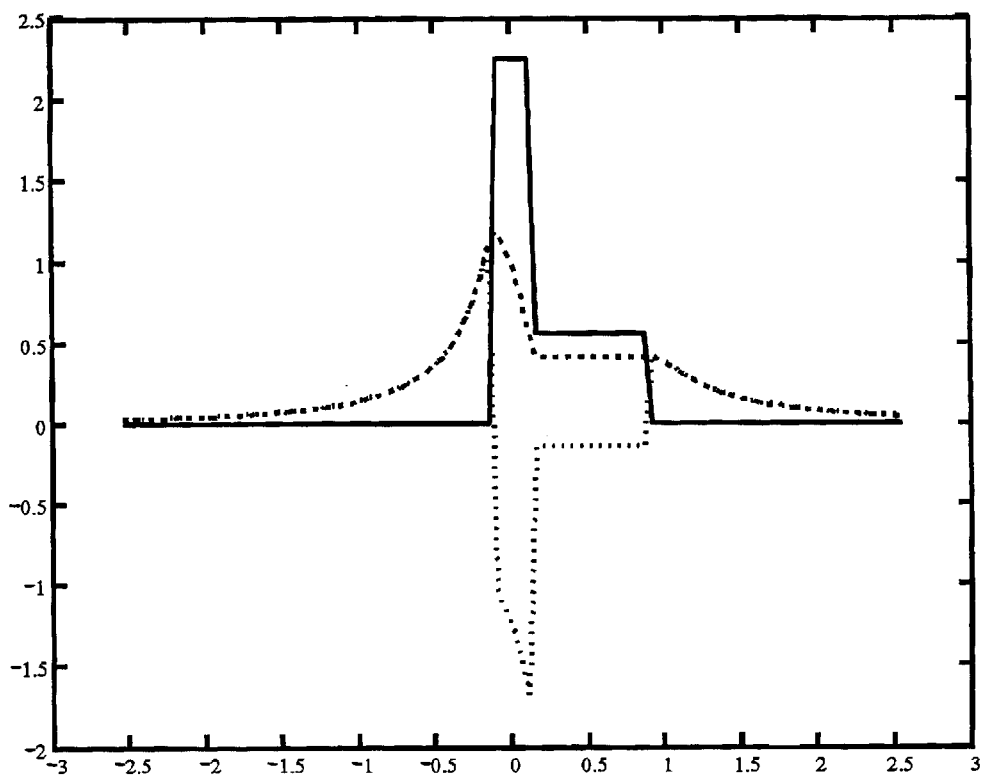
FIG. 5 is a graph comparing a vertical measurement profile of a combined HMD/VMD tool to that of a VMD-only tool and HMD-only tool.

The dotted line in FIG. 5 is the vertical measurement profile of the horizontal magnetic dipole array, the dashed line is the vertical measurement profile of the vertical magnetic dipole array, and the solid line is the vertical measurement profile of the horizontal/vertical combination. Note that the vertical resolution of the combined log is not subject to the undesirable "tails". While the discussion here has focused on a single-transmitter, two-receiver tool (with both horizontal and vertical components for each transducer), the above combining equation works to eliminate measurement profile tails for any combination of transmitters and receivers having both horizontal and vertical component measurements.

Of course, a designer may wish to make trade-offs to improve the overall utility of a tool. In such a scenario, it may be desirable to combine the horizontal and vertical component logs in different proportions to reduce, but not necessarily eliminate, the tails of the vertical measurement profile. Such a configuration might offer reduced sensitivity to other undesirable effects (e.g. borehole effect) or enhanced sensitivity to desirable effects (e.g. anisotropy).

Radial Measurement Profile and Investigation Depth

The radial measurement profile of an induction tool can be calculated from the total geometric factor. For horizontal and vertical magnetic dipole arrays, the radial measurement profile is:

$$R_{hmd}(r) = \int_{-\infty}^{\infty} \int_{-\pi}^{\pi} G_{hmd} d\varphi dz$$

$$R_{vmd}(r) = \int_{-\infty}^{\infty} \int_{-\pi}^{\pi} G_{vmd} d\varphi dz$$

Although the radial measurement profile itself is informative, it is generally considered more informative to examine the integrated radial measurement profile. The integrated radial measurement profile shows the cumulative contribution of the enclosed measurement volume to the overall measurement, and it converges to one (100%) at large radii:

$$IR_{hmd}(r) = \int_0^r R_{hmd}(\rho) d\rho$$

$$IR_{vmd}(r) = \int_0^r R_{vmd}(\rho) d\rho$$

Figure 8:
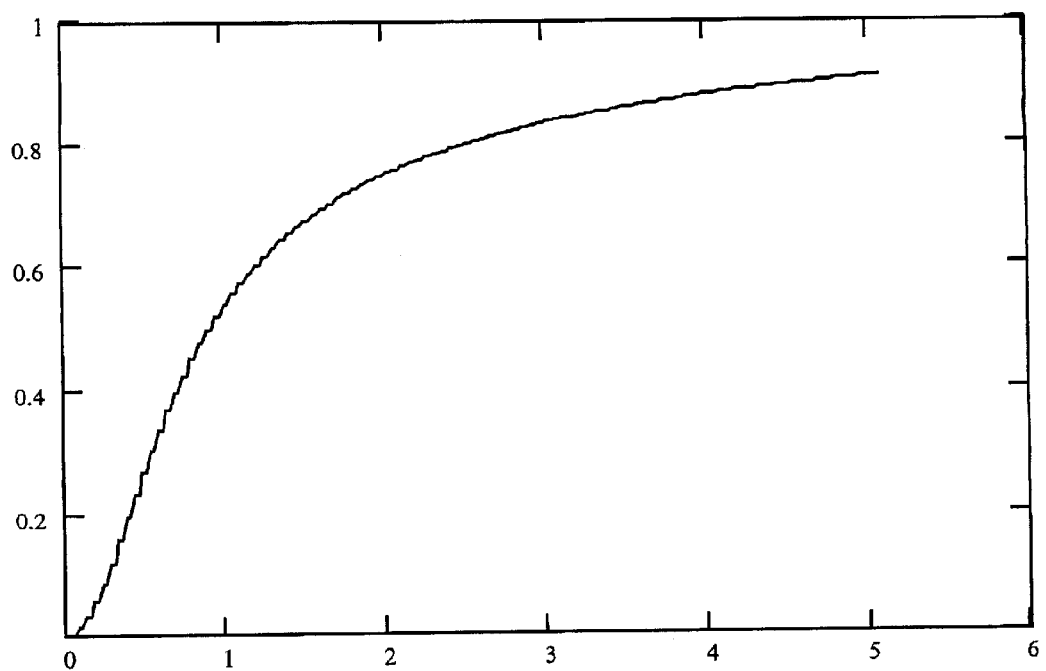
FIG. 8 is a graph of an integrated radial measurement profile for a combined HMD/VMD tool.

FIG. 6 shows the integrated radial measurement profile for the horizontal magnetic dipole one-transmitter-two-receiver configuration. Note the negative region between r=0 and r=1. This negative contribution is undesirable and it causes a significant borehole effect. The integrated radial measurement profile for the vertical magnetic dipole configuration is shown in FIG. 7, and this curve has a more desirable shape. Unlike the vertical measurement profile case, a long tail is considered beneficial for the horizontal measurement profile. FIG. 8 shows the integrated radial measurement profile for the combined horizontal and vertical magnetic dipole log. Note that the negative contribution from the borehole and region immediately beyond are completely absent.

The investigation depth of a tool is defined to be the depth at which the integrated radial measurement profile equals 0.5. The investigation depth of the combined horizontal/vertical log is less than those of the vertical magnetic dipoles, but this may be a small price for the greatly enhanced vertical resolution of this tool. This is particularly true since the investigation depth for the horizontal magnetic dipole is deceptively deep due to the negative portion of the radial measurement profile.

Anisotropy

Figure 9:
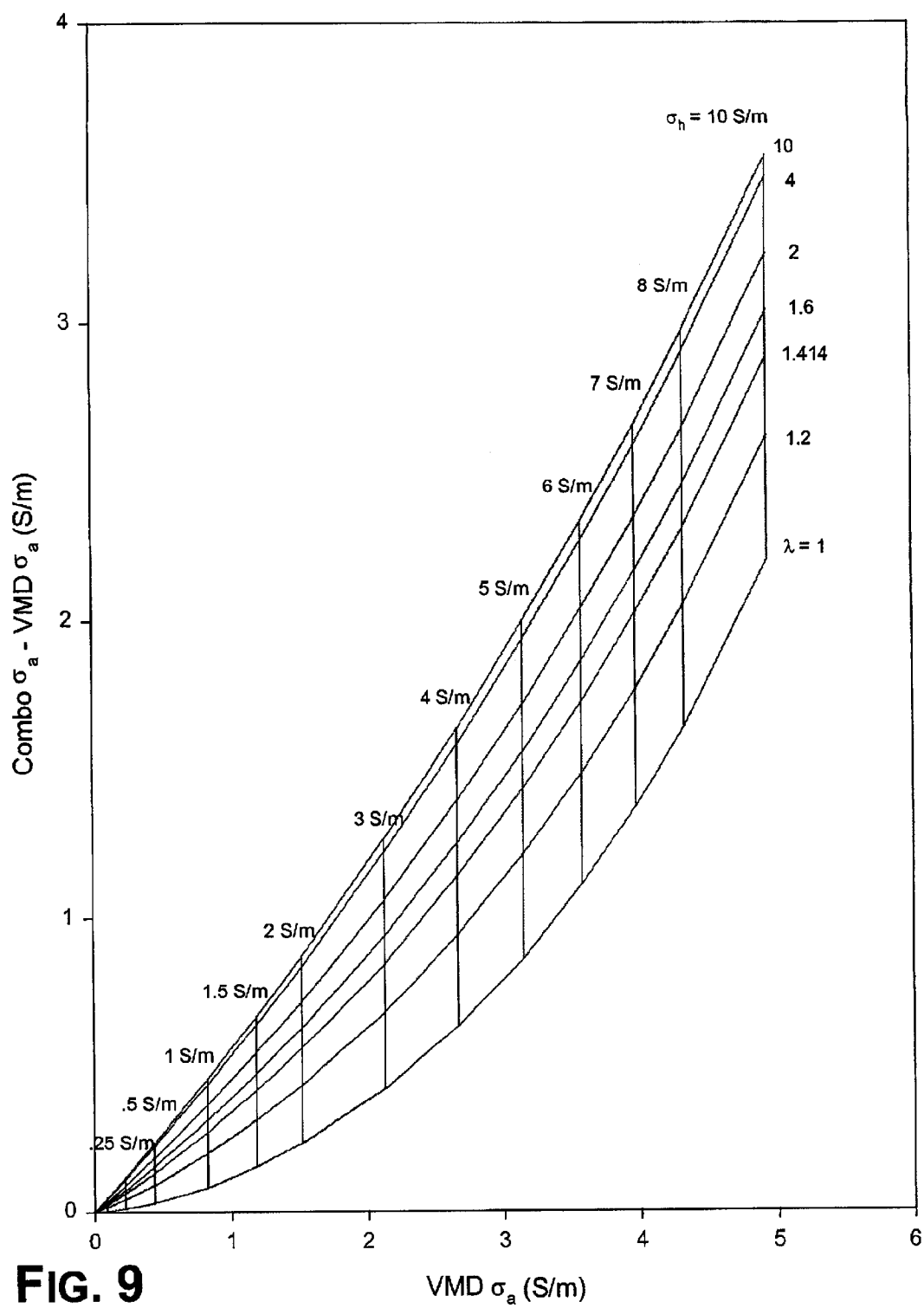
FIG. 9 is a graph showing the sensitivity of the combined HMD/VMD tool to formation anisotropy.

It is known that the horizontal magnetic diople transmitter-receiver pairs are sensitive to resistivity anisotropy in the formation. (See, e.g., J. H. Moran and S. Gianzero, Geophysics, Vol. 44, P. 1266, 1979.) Although some sensitivity is lost, the combination log still retains adequate sensitivity to anisotropy. FIG. 9 shows apparent conductivity as calculated from the combination log measurements (combo $\sigma_a$) minus apparent conductivity as calculated from vertical magnetic dipole sonde measurements (VMD $\sigma_a$). This difference is shown as a function of VMD $\sigma_a$ for seven different anisotropy coefficients. The spread in the curves indicates the sensitivity of the tool to anisotropy.

Ultimately, the results of processing the combination and VMD sondes to enhance resolution and correct for skin and borehole effects should yield measures of the formation conductivities that are closer to the true conductivity values. In effect, their measured conductivities should be close to the homogeneous value of formation conductivity. It may be desirable to perform such processing first, and then performing the anisotropy determination using the more correct values of formation conductivity.

Conclusion

The vertical measurement profile of the combination sonde is compared in FIG. 5 against that of the conventional VMD sonde. Clearly the combination sonde is better focused compared to both the conventional VMD sonde and the HMD sonde. The large tail outside the transmitter-receiver spacing has been totally eliminated. The negative contribution from the HMD sonde has also been removed. Further, the rectangular nature of the combination sonde's vertical measurement profile lends itself to deconvolution for improved vertical resolution in the formation log. Although skin effect has not been considered here, it is expected that the elimination of the shoulder effect will substantially reduce the skin effect, which is itself a far field phenomenon. Finally, the combination sonde advantageously retains its sensitivity to anisotropy so that anisotropy measurements can be made.

Numerous variations and modifications will become apparent to those skilled in the art once the above disclosure is fully appreciated. For example, multiple horizontal magnetic dipole array response signals and multiple vertical dipole array response signals may be combined with a total proportionality of vertical to horizontal contributions approximately equal to minus three. The use of multiple signals may provide improved performance. It is intended that the following claims be interpreted to embrace all such variations and modifications.

What is claimed is:

1. A method of measuring formation properties, the method comprising:
   obtaining a first response signal from a first transmitter-receiver array of antenna elements having magnetic dipoles oriented parallel to a tool axis;
   obtaining a second response signal from a second transmitter-receiver array of elements having magnetic dipoles oriented perpendicular to the tool axis;
   combining the first and second response signals to obtain a combination response signal having enhanced vertical resolution, wherein said combining includes:

performing a weighted summation of the first and second response signals, wherein the ratio of the weight of the first response signal to the weight of the second response signal is approximately minus three (−3).

2. The method of claim 1, wherein the weighted summation is performed in accordance with the following equation:

$$\text{Final Response} = a \times VMD \text{ response} - b \times HMD \text{ response},$$

where VMD response represents the first response signal, HMD response represents the second response signal, and a and b are optimization parameters.

3. The method of claim 1, wherein the first transmitter-receiver array has antenna element placement substantially equal to antenna element placement of the second transmitter-receiver array.

4. The method of claim 3, wherein the antenna elements of the first and second transmitter-receiver arrays are appropriately-oriented coils of electrically-conductive material.

5. The method of claim 1, further comprising:
processing the combination response signal to determine a log of formation resistivity.

6. The method of claim 1, further comprising:
processing the first response signal to determine a first apparent formation conductivity;
processing the combination response signal to determine a second apparent formation conductivity; and
combining the first and second apparent formation conductivities to determine a formation anisotropy.

7. A logging system that comprises:
a multiaxial induction tool configured to provide signals indicative of a vertical magnetic dipole (VMD) response and a horizontal magnetic dipole (HMD) response; and
a processor coupled to the multiaxial induction tool and configured to determine a combined response from the VMD and HMD responses, wherein the combined response has a substantially rectilinear vertical measurement profile, wherein the processor determines the combined response as a weighted sum of the VMD response and the HMD response, and wherein the relative weights of the VMD and HMD responses are approximately 3/2 and −1/2, respectively.

8. The system of claim 7, wherein the processor is further configured to determine a resistivity log of a formation from a combined response determined as the induction tool is moved through a borehole.

9. The system of claim 7, wherein the multiaxial induction tool includes at least one transmitter triad and at least two receiver triads.

10. The system of claim 7, wherein the processor is further configured to determine a formation resistivity anisotropy from the combined response and the VMD response.

11. A method of measuring formation properties, the method comprising:
obtaining a first response signal from a first transmitter-receiver array of antenna elements having magnetic dipoles oriented parallel to a tool axis;
obtaining a second response signal from a second transmitter-receiver array of elements having magnetic dipoles oriented perpendicular to the tool axis;
combining the first and second response signals to obtain a combination response signal having enhanced vertical resolution, wherein said combining includes performing a weighted summation of the first and second response signals.

12. The method of claim 11, wherein the weighted summation is performed in accordance with the following equation:

$$\text{Final Response} = a \times VMD \text{ response} - b \times HMD \text{ response},$$

where VMD response represents the first response signal, HMD represents the second response signal, and a and b are optimization parameters.

13. The method of claim 11, further comprising processing the combination response signal to determine a log of formation resistivity.

14. The method of claim 11, further comprising:
processing the first response signal to determine a first apparent formation conductivity;
processing the combination response signal to determine a second apparent formation conductivity; and
combining the first and second apparent formation conductivities to determine a formation anisotropy.

15. A logging system that comprises:
a multiaxial induction tool configured to provide signals indicative of a vertical magnetic dipole (VMD) response and a horizontal magnetic dipole (HMD) response; and
a processor coupled to the multiaxial induction tool and configured to determine a combined response from the VMD and HMD responses, wherein the combined response has a substantially rectilinear vertical measurement profile, and wherein the processor determines the combined response as a weighted sum of the VMD and the HMD response.

16. The system of claim 15, wherein the processor is further configured to determine a resistivity log of a formation from a combined response determined as the induction tool is moved through a borehole.

17. The system of claim 15, wherein the multiaxial induction tool includes at least one transmitter triad and at least two receiver triads.

18. The system of claim 15, wherein the processor is further configured to determine a formation resistivity anisotropy from the combined response and the VMD response.

* * * * *